United States Patent [19]

Fricke

[11] 4,077,211

[45] Mar. 7, 1978

[54] STEPLESSLY VARIABLE HYDRAULIC DRIVE SYSTEM FOR VEHICLE

[75] Inventor: Hans Jürgen Fricke, Stuttgart, Germany

[73] Assignee: Robert Bosch GmbH, Stuttgart, Germany

[21] Appl. No.: 743,288

[22] Filed: Nov. 18, 1976

[30] Foreign Application Priority Data

Dec. 11, 1975 Germany .......................... 2555716

[51] Int. Cl.² ............................................ F15B 13/09
[52] U.S. Cl. ...................................... 60/428; 60/429; 60/464; 60/486
[58] Field of Search ................ 60/428, 429, 435, 464, 60/486, 494; 180/44 F, 66 R

[56] References Cited

U.S. PATENT DOCUMENTS

| 3,038,312 | 6/1962 | Marsh ................................. 60/494 X |
| 3,092,970 | 6/1963 | Sampietro ........................... 60/435 |
| 3,972,187 | 8/1976 | Ital et al. ............................. 60/428 |

Primary Examiner—Edgar W. Geoghegan
Attorney, Agent, or Firm—Michael J. Striker

[57] ABSTRACT

A hydrostatic drive system for connecting a prime mover and a hydraulically operable load such as a hydraulic motor connected to the vehicular wheel has a constant-displacement pump and a variable-displacement pump both connected to the prime mover. The variable-displacement pump is completely reversible and is of maximum displacement substantially greater than the constant displacement pump. This variable-displacement pump is permanently connected across the hydraulic motor of the load. A clutch connects the constant-displacement pump to the same shaft as the variable-displacement pump. The outputs of the constant-displacement pump may be connected by a valve either in parallel to the outputs of the variable-displacement pump, or may simply connect them together for operation of the load only by the variable-displacement pump.

9 Claims, 1 Drawing Figure

U.S. Patent   March 7, 1978   4,077,211
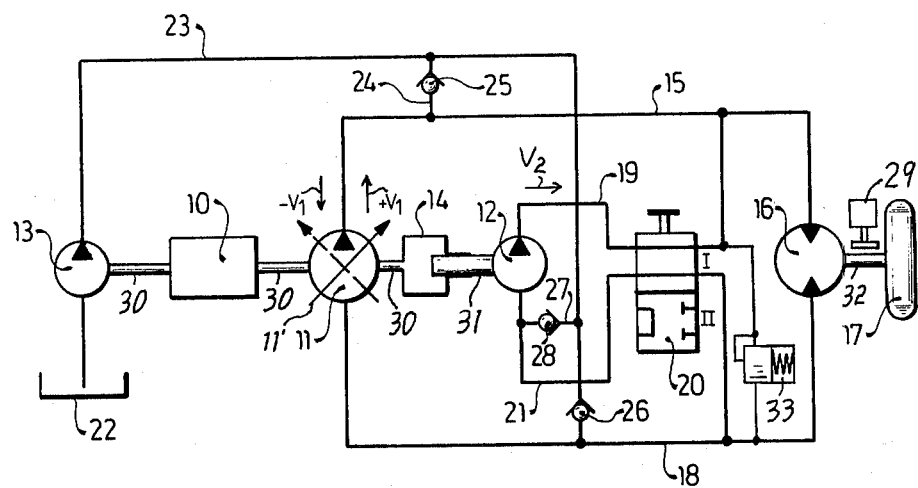

STEPLESSLY VARIABLE HYDRAULIC DRIVE SYSTEM FOR VEHICLE

BACKGROUND OF THE INVENTION

The present invention relates to a hydraulic drive system. More particularly this invention concerns a hydrostatic transmission for interconnection of a prime mover and a hydraulically operable load.

A drive is known which interconnects a prime mover and a hydraulically operable load and which comprises a variable displacement pump permanently connected to the prime mover and having an outlet side and an inlet side connected via conduits to a hydraulic motor constituting part of the load. With such a system it is therefore possible to operate the prime mover at a substantially continuous rate, while varying the operational speed of the load by varying the displacement of the pump. When the pump is of the reversible type it is also possible, therefore, to reverse the operation direction of the load while still operating the prime mover at the same constant rate. Such an arrangement is often used to drive the wheels of a piece of equipment such as s forklift which must be able to move forward and backward at a variable rate of speed.

It has been suggested to connect in parallel to the variable-displacement pump a constant-displacement pump of the same maximum displacement. Thus it is possible to completely stop the load simply be operating the variable-displacement pump in reverse. Nevertheless such a system has proven in practice to be relatively disadvantageous and starting-up of both the pumps often presents an undue load on the prime mover.

SUMMARY OF THE INVENTION

It is therefore an object of the present invention to provide an improved hydraulic drive system.

Yet another object is the provision of such a system which allows for the stepless variation of operation speed of the load both in the forward and reverse directions.

Yet another object is to provide an hydrostatic drive which overcomes the above-given disadvantages.

These objects are attained according to the present invention in a hydraulic drive system which comprises a constant-displacement pump connected to the prime mover, a variable-displacement pump connected to the prime mover also and of a maximum displacement substantially greater than that of the constant-displacement pump. Hydraulic conduits connect the variable displacement pump with the load so that this load can be driven by the variable displacement pump which is in turn driven by the prime mover. Furthermore, means is provided between the constant-displacement pump and the load which includes a valve for connecting the constant-displacement pump in parallel with the variable-displacement pump to the load and for disconnecting the constant-displacement pump from the load. Thus, with such a system it is possible for the direction of operation of the load which is normally constituted at least in part by a hydraulic motor to be reversed simply by operating the variable-displacement pump in a direction opposite the constant-displacement pump, since the larger displacement of the variable-displacement pump will more than cancel out that of the constant-displacement pump.

In accordance with yet another feature of this invention both of the pumps are of the positive-displacement type, by which is meant in each of the pumps a definite volume of liquid is delivered for each cycle of the pump operation, regardless of the resistance offered and provided that the capacity of the power unit driving the pump is not exceeded.

The variable-displacement pump of this invention is permanently connected to the prime mover and always operated thereby. On the contrary, the constant-displacement pump is connected to the drive shaft of the prime mover or to the drive shaft of the pump by means of a clutch so that if desired it can be disconnected.

In accordance with yet another feature of this invention valve means is provided for connecting in one position the constant-displacement pump in parallel to the variable-displacement pump and in another position for simply connecting the output side of the constant-displacement pump to its input side. Thus it is possible to switch the constant-displacement pump out of the circuit and drive the load exclusively with the variable-displacement pump. Such operation is extremely handy when a fine degree of control is desired at low speeds.

Furthermore it is possible in accordance with this invention to operate the constant-displacement pump as a motor. Thus the system can be started up with the variable-displacement pump in the neutral position. This can be effected, for instance, in an axial-piston type pump by starting the prime mover up with the swash plate of the piston pump lying perfectly orthogonal to the rotation axis of this pump. Once the prime mover, normally an internal-combustion engine, is started the adjustment member, here the swash plate, can be moved to set the pump displacing fluid. Thereafter the load may be braked and the constant displacement pump may be connected into the circuit while the clutch connecting it to the prime mover is still open. Thus the fluid from the variable-displacement pump will be fed to the constant-displacement pump and drive it motor-fashion until it is up to speed. Then the user need merely close the clutch so as to connect the constant-displacement pump to the prime mover without any shock to the system.

The novel features which are considered as characteristic of the invention are set forth in particular in the appended claims. The invention itself, however, both as to its construction and its method of operation, together with additional objects and advantages thereof will be best understood from the following description of a specific embodiment when read in connection with the accompanying drawing.

BRIEF DESCRIPTION OF THE DRAWING

The sole FIGURE of the drawing shows diagrammatically a drive system according to this invention.

DESCRIPTION OF THE PREFERRED EMBODIMENT

As shown in the drawing the drive system comprises an internal combustion engine 10 constituting a prime mover and having an output or drive shaft 30 extending from both sides. On one side this drive shaft 30 is connected to an axial-piston type pump 11 having a displaceable swash plate 11' which allows it to be operated so as to produce a throughput or displacement of $+ V_1$ or $- V_1$.

This variable-displacement pump 11 is connected via a normally high-pressure line 15 and a normally low-pressure line 18 to opposite sides of a hydraulic motor 16 connected via a shaft 32 to a ground-engaging wheel 17 which here may be the drive wheel of a forklift.

The shaft 30 extends completely through the pump 11 and is connectable via a clutch 14 to the shaft 31 of a constant-displacement pump 12 which may be of the radial-piston type which has a normal throughput or displacement of $V_2$ which is substantially smaller than $V_1$. This constant-displacement pump 12 has a high-pressure output line 19 and a low-pressure inlet line 21 both connected to a four-way valve 20. This valve 20 is of the two-position type and in position I connects the high-pressure line 19 to the line 15 and the low-pressure line 21 to the line 18 so that pumps 11 and 12 are in parallel.

On the other side of the engine 10 the shaft 30 is connected to an auxiliary pump 13 having an inlet connected to a hydraulic fluid reservoir 22 and an outlet line 23 connected via a check valve 26 to the low-pressure line 18. In addition a branch line 24 having another check valve 25 connects this line 23 to the line 15 and yet another branch line 27 having a check valve 28 connects the line 23 with the line 21. Thus fluid can only flow out of the line 23 and the pump 13 is of the non positive-displacement type so as to serve merely to maintain the entire system under full pressurization.

Before starting the system up the swash plate 11' is set so that no fluid flows through the pump 11 on rotation of the shaft 30. In addition the clutch 14 is open or disengaged.

Once the motor 10 is up to speed the swash plate 11' is tilted so as to produce high-pressure in the line 18 and low-pressure in the line 15. At the same time a brake 29 is applied to the shaft 32 so as to prevent rotation of the axial-piston motor 16 and force fluid to flow through the constant displacement pump 12 from the line 21 to the line 19. This will cause the pump 12 to rotate at relatively high speed until the shafts 30 and 31 are operating synchronously, at which time the clutch 14 can be closed or engaged easily.

Thereafter the swash plate 11' may be returned to the neutral position and beyond this position so as to produce high pressure in the line 15 and low pressure in the line 18. Releasing of the brake 29 will therefore cause the output of both of the pumps 11 and 12 operating in parallel to flow through the motor 16 operating the wheel 17 at a relatively high rate of speed. It is noted that a pressure relief valve 33 is provided connected between the lines 15 and 18 to prevent overpressures from building up in the system. It is therefore possible to run the motor 16 using the combined outputs of the pumps 11 and 12. When the maximum $+ V_1$ is added to $V_2$ the maximum speed is obtained. The speed can be reduced by moving the swash plate 11' backwardly into the even position so that only the flow $V_2$ passes through the motor 16. Similarly, it is possible to increase fineness of control by switching the valve 20 and shunting the two sides 19 and 21 of the pump 12 together through the part II of the valve 20 so that only the output of the pump 11 is fed through the motor 16. This mode of operation can be used for low-speed control.

It is also possible with the valve 20 in position I to reverse the direction of rotation of the speed of motor 17 for a low-speed reverse by moving the swash plate 11' until the pump output is reversed at $- V_1$. Since $V_1$ is greater than $V_2$ this will cause the pump 16 to be pressurized at a differential level which will affects a slow backward movement.

Should it be desired, as is frequently the case in a fork-lift truck or the like, to move backwardly at a high rate of speed the valve 20 can be switched to position II so that the full output of the pump 11 can be applied in reverse to the motor 16 and allow almost full-speed reverse operation.

During all such operations the pump 13 is effective to maintain any of the lines 15, 18, or 21 fully pressurized.

Thus it is possible to drive a vehicle with the system according to this invention forwardly at a very high rate of speed, but nonetheless it is possible to vary this rate of speed continuously and steplessly from a standstill to the maximum rate. Similarly, it is possible to obtain a relatively slow reverse gear and, if desired, a relatively high speed in reverse. At the same time during warmup the entire system, without provision of complicated clutching equipment can be positioned so that it presents no load to the motor driving it yet once running it can be smoothly moved into service, using only the simplest jaw-type clutch between the pump 12 and the shaft 30.

It will be understood that each of the elements described above, or two or more together, may also find a useful application in other types of hydraulic system differing from the types described above.

While the invention has been illustrated and described as embodied in a hydraulic drive system for a vehicle, it is not intended to be limited to the details shown, since various modifications and structural changes may be made without departing in any way from the spirit of the present invention.

Without further analysis the foregoing will so fully reveal the gist of the present invention that others can, by applying current knowledge, readily adapt it for various applications without omitting features that, from the standpoint of prior art, fairly constitute essential characteristis of the generic or specific aspects of this invention.

What is claimed as new and desired to be protected by Letters Patent is set forth in the appended claims:

1. A hydraulic drive system for interconnection of a prime mover and a hydraulically operable load, said system comprising;
    a constant-displacement pump connected to said prime mover;
    a variable-displacement pump connected to said prime mover and of maximum displacement substantially greater than said constant-displacement pump;
    hydraulic conduits connecting said variable-displacement pump with said load, whereby said load can be driven by said variable displacement pump which is in turn driven by said prime mover;
    means between said constant-displacement pump and said load including a valve for connecting said constant-displacement pump in parallel with said variable-displacement pump to said load and for disconnecting said constant-displacement pump from said load; and
    means in said constant-displacement pump for operating same as a motor when said constant-displacement pump is connected with said variable-displacement pump by said valve.

2. The system defined in claim 1 wherein said variable-displacement pump has a first side and a second side connected to said conduits and is fully reversible, whereby said first side may be at relatively high pressure and said second side at relatively low pressure and vice versa.

3. The system defined in claim 1 wherein said pumps are both of the positive-displacement type.

4. The system defined in claim 1 wherein said constant-displacement pump has a high-pressure side and a low-pressure side, said valve being displaceable between a position connecting said sides to said load and a position connecting said sides together.

5. The system defined in claim 1, further comprising clutch means for disconnecting said constant-displacement pump from said prime mover.

6. The system defined in claim 1 wherein said prime mover has an output shaft, said variable-displacement pump having a drive shaft permanently connected to said output shaft, said system further comprising clutch means between said constant-displacement pump and one of said shafts for driving of said constant-displacement pump thereby.

7. The system defined in claim 1 further comprising means for braking said load and thereby feeding the entire output of said variable-displacement pump via said valve into said constant-displacement pump, and clutch means for connecting said constant-displacement pump with and disconnecting same from said prime mover.

8. The system defined in claim 1 wherein said load is a hydraulic motor.

9. The system defined in claim 8 wherein said load includes a ground-engaging wheel connected directly to said motor.

* * * * *